US011985242B2

(12) United States Patent
Guionneau

(10) Patent No.: US 11,985,242 B2
(45) Date of Patent: May 14, 2024

(54) METHOD AND SYSTEM FOR AUTHENTICATING A USER ON A USER DEVICE

(71) Applicant: BULL SAS, Les Clayes-sous-bois (FR)

(72) Inventor: Christophe Guionneau, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 159 days.

(21) Appl. No.: 17/492,517

(22) Filed: Oct. 1, 2021

(65) Prior Publication Data

US 2022/0109572 A1 Apr. 7, 2022

(30) Foreign Application Priority Data

Oct. 2, 2020 (EP) .................................... 20306147

(51) Int. Cl.
*H04L 9/32* (2006.01)
*G06F 21/41* (2013.01)
*H04L 9/40* (2022.01)

(52) U.S. Cl.
CPC ............ *H04L 9/3213* (2013.01); *G06F 21/41* (2013.01); *H04L 63/0815* (2013.01)

(58) Field of Classification Search
CPC .... G06F 21/41; H04L 9/3213; H04L 63/0815
See application file for complete search history.

(56) References Cited

U.S. PATENT DOCUMENTS 9,241,257 B1 * 1/2016 Kim .................. H04M 1/67
9,710,640 B1 * 7/2017 Ramalingam ........... H04L 63/18
9,756,096 B1 * 9/2017 Lilienthal ........... H04L 65/4015
11,159,326 B1 * 10/2021 Nelson .................. G06F 3/0484
11,288,642 B1 * 3/2022 Hawes ................. G06Q 20/102
11,552,936 B2 * 1/2023 Call ..................... H04L 63/0846
2002/0183045 A1 * 12/2002 Emmerson .............. H04L 67/04
455/412.1
2015/0172269 A1 6/2015 Cha et al.
2017/0078272 A1 3/2017 Guionneau
2017/0249393 A1 * 8/2017 Nair ......................... G06F 16/25
2018/0131685 A1 5/2018 Deshpande et al.
2018/0376335 A1 * 12/2018 Su .......................... H04W 12/06
2021/0360311 A1 * 11/2021 Richardson ............ H04N 7/147
2022/0029962 A1 * 1/2022 Teo ..................... H04L 63/0236
2022/0150237 A1 * 5/2022 Canfield ............... H04L 63/104

OTHER PUBLICATIONS

European Search Report issued in EP20306147.8, dated Feb. 26, 2021 (9 pages).

* cited by examiner

*Primary Examiner* — Mohammad A Siddiqi
(74) *Attorney, Agent, or Firm* — ARC IP Law, PC; Joseph J. Mayo

(57) ABSTRACT

A method for authenticating a user on a user device with an authentication phase that includes: displaying a page of an authentication server in an internet browser, initiating an authentication process via this page to authenticate the user to a server remote from the user device, supplying to the user device a proof of authentication from the remote server, and opening an access session to the user device using this proof of authentication. Embodiments of the invention may include a computer program and an authentication system implementing such a method.

11 Claims, 3 Drawing Sheets

METHOD AND SYSTEM FOR AUTHENTICATING A USER ON A USER DEVICE

This application claims priority to European Patent Application Number 20306147.8, filed 2 Oct. 2020, the specification of which is hereby incorporated herein by reference.

BACKGROUND OF THE INVENTION

Field of the Invention

The present invention relates to a method for authenticating a user on a user device. It also relates to a system implementing such a method.

The field of the invention is the field of authenticating a user on a user device, in particular a data processing device such as a computer, in order to permit said user to access said user device.

Description of the Related Art

Enterprises increasingly use business applications that can be accessed in a flexible manner, whether inside or outside the enterprise network. Access to these applications is generally gained via a browser of the enterprise, or a client application installed on the user device, and requires user authentication.

To this end, the user must first open a session on the user device for access to the user device. When the session is open and the user has access to the device, the user launches an internet browser or the client application. Authentication is then performed, either as a function of the information items supplied by the user, or as a function of identification data items retrieved in an automated manner from a server of the enterprise when the user is located inside the enterprise network. The identification data items are verified and access to the service is permitted or denied.

Different authentication techniques are available for verifying the identity of the user and their access rights in order to permit or deny access to an application. All these techniques require the user to have access to the user device, also called "workstation", and generally cannot be implemented until the user has accessed the workstation.

Access to the workstation, or to the user device, requires authentication that is locally managed by the workstation, or by an authentication domain of a private network to which the workstation belongs, such as an enterprise network. Authentication by an authentication domain of a private network is not possible unless the workstation is located inside the private network in question. Thus, when the workstation is located outside the network, access to said workstation is managed entirely locally in the workstation, by using a local authentication cache.

However, such an authentication technique does not allow dynamic and flexible management of access to the workstations, regardless of where they are sited. In addition, this authentication technique can be problematic as regards security of the workstations, in particular in the event that usernames or workstations are stolen.

An aim of the present invention is to overcome at least one of the aforementioned drawbacks.

Another aim of the present invention is to propose an authentication technique allowing more dynamic and flexible management of access to a workstation regardless of where it is sited.

An aim of the present invention is also to propose an authentication technique permitting access to the user workstation, that is more secure regardless of where it is sited.

BRIEF SUMMARY OF THE INVENTION

One or more embodiments of the invention make it possible to achieve at least one of the aforementioned aims by a method for authenticating a user on a user device, said method comprising an authentication phase comprising the following steps:
- displaying, in a window of an internet browser, a first internet page of an authentication server to which said user device is connected beforehand via the internet network;
- initiating, via said first internet page, a process of authenticating said user to at least one server remote from said user device;
- when said authentication is successful, supplying to said user device, by at least one remote server, at least one data item, called proof of authentication, attesting to successful authentication; and
- opening an access session to said user device by using said proof of authentication.

Thus, the method according to one or more embodiments of the invention proposes to control user access to a user device, by authenticating this user to a server, remote from said user device, and connected to said user device via an internet connection. Thus, it is possible to perform user authentication even before the user accesses the user device, in order to permit or deny access to the user device for this user.

One or more embodiments of the invention allow greater security, or at least the same level of security, during access to user devices, temporally and spatially, whether or not the user device is located within an authentication domain.

In addition, according to one or more embodiments of the present invention, access to a user device is permitted or denied by authentication performed on a remote server independent from the user device. Thus, an administrator can access and modify, on the fly, the access rights to a particular user device, for a particular user, without any intervention on the user device(s). This allows easier, more flexible and more dynamic access control of a user device, and even more significantly, of a fleet of user devices.

The authentication process can be of any type.

The authentication process can verify the identity of the user as a function of at least one identity data item supplied by the user device to the authentication server, the proof of authentication being supplied as a function of said identity.

At least one identity data item can comprise a username, a password, a one-time password, a biometric data item such as a fingerprint, a facial data item, and/or a retinal data item, etc.

At least one identification data item can be entered manually by the user.

At least one identification data item can be read from a computerized media connected to the user device, such as a USB key, a chip card, etc.

At least one identification data item can be determined by a sensor connected to or integrated in the user device, such as a fingerprint reader, a camera, etc.

The authentication process can verify at least one access right applicable to the user, the proof of authentication being supplied as a function of said access right.

In this case, the authentication process can verify:

on the one hand, the identity of the user as a function of the identity data items, and on the other hand, at least one access right applicable to this user; before delivering the proof of authentication permitting the user access to this user device.

At least one access right applicable to this user can be stored on the authentication server, or on another device or server that can be accessed by the authentication server via the internet network.

At least one access right can be specific to the user.

At least one access right can be specific to the user device.

At least one access right can be fixed, or variable as a function of a time data item, for example.

The proof of authentication can be any type of digital proof and can comprise any type of data.

Advantageously, the proof of authentication can comprise an encrypted data item, in particular with a private key associated with a public key stored at the level of said user device. In this case, the user device can be configured to decrypt the data item received with the public key and use this data item to give user access to the user device.

Alternatively or in addition, the proof of authentication can comprise an authentication token.

According to an embodiment, the token can be a single-use token.

The token can have a one-time validity such that when it has been used once it loses its validity.

The token can have validity during a predetermined time period. In this case, provision can be made to terminate the access of this user to the user device on termination of the validity of the token.

According to another embodiment, the token can be multiple-use, valid for permitting access of the same user to the same user device on several occasions.

According to a particularly advantageous characteristic, it is possible to use the proof of authentication, after access to said user device, to perform an authentication, called federated authentication, of the user:

to an application, called external application, run on a server remote from the user device and accessible by said user device via the internet network; and/or to an application, called internal application, run on a server located in a network or authentication domain in which said user device is located, and accessible by said user device via said network.

Thus, for a given user, one and the same proof of authentication can be used, on the one hand to permit access to the user device for this user, and on the other hand for identifying to one or more applications accessed by this user with this user device.

Generally, access to the external application is performed by an internet browser by accessing a URL of a server on which this application is run, or by a client application run on the user device, which co-operates with a server application run on a remote server. Such an application is generally called a Software as a Service application (SaaS).

Similarly, the internal application is run on a server and is accessed by an internet browser or a client application. In this case, unlike the external application, the server is located in the same domain as the user device, and access is gained to the client application without leaving the private network.

Advantageously, the method according to one or more embodiments of the invention can comprise, prior to the authentication phase, a step of selecting an authentication mode from among several authentication modes. In this case, the authentication phase can be a function of the chosen authentication mode.

For example, the authentication phase can be performed, or not performed, as a function of the chosen authentication mode.

Alternatively, or in addition, the authentication process can be a function of the chosen authentication mode. For example, a first authentication process can be initiated when the user chooses a first authentication mode, and another authentication process can be initiated when the user chooses another authentication mode. The authentication processes can differ:

in their implementation. For example, one authentication process can be run on a single authentication server, while another authentication process may require authentication on several servers; and/or in the type of authentication. For example, one authentication process can implement a simple authentication verifying previously-stored fixed data items, such as a username and a password, while another authentication process can implement strong authentication based on changeable data items; and/or in the channels implemented for authentication. For example, one authentication process can request identification data items via an internet page, while another authentication process may require data items to be supplied via a phone messaging service; and/or in the nature of the proof of authentication. For example, one authentication process can supply a single-use proof of authentication, while another authentication process may supply a multiple-use proof of authentication or one allowing federated authentication to be implemented, etc.

Thus, the invention allows greater flexibility during authentication of a user for access to a user device, and the user has greater freedom of choice of a particular authentication mode as a function of the intended use of the user device, and/or of the available identification data items.

Advantageously or in addition, the method according to one or more embodiments of the invention can comprise, during the authentication phase, selecting an authentication mode from among several authentication modes, in the internet browser window.

This selection can be performed on the authentication server, in the first page displayed during the display step. Alternatively, this selection can be performed in an internet page of another server, subsequently displayed.

The authentication modes may change, in their implementation, in the type of authentication implemented, in the channels implemented for authentication, or else in the proof of authentication supplied, as described above.

According to embodiments, the authentication process can be performed:

via the first internet page displayed: in this case, this first internet page is the only internet page displayed in the internet browser window during the authentication process; or by a sequence of internet pages comprising the first internet page and at least one other internet page displayed, in particular in a chained manner, by said authentication server or by another authentication server.

In this second case, in the sequence of internet pages, the following page may only be displaced if the operation on the preceding page has been successful.

As indicated above, the authentication can be of any type.

In particular, the authentication can be a multi-factor authentication, allowing strong authentication to be performed.

According to embodiment examples, the authentication can be performed:
- exclusively by the authentication server;
- by the authentication server and at least one other server;
- by a server other than the authentication server.

In all cases, the proof of authentication can be generated either by the authentication server, or by another server.

In all cases, the proof of authentication can be transmitted to the user device by the authentication server or by another server.

The authentication phase can comprise transmitting, by the user device to the authentication server, at least one contextual data item relating to authentication, the authentication taking account of said at least one contextual data item.

Thus, the user can be permitted or denied access to the user device as a function of at least one contextual data item.

For example, an administrator can deny access to the user device outside working hours, or during predetermined periods such as the weekend or at night. In this case, the transmitted contextual data items can comprise a time data item or a date data item. According to another embodiment example, an administrator can deny access to the user device outside a geographical area, such as the country where the user works, so that the user cannot access the user device when located in another country. In this case, the contextual data transmitted can comprise a data item relating to the geographical location of the user device.

Generally, a contextual data item can be of any type.

In particular, the contextual data item or items can comprise any combination of at least one of the following data items:
- at least one data item relating to the user device, such as a serial number, a characteristic of an operating system of said user device,
- at least one data item relating to at least one application running, or active, at the level of the device, such as for example an antivirus application;
- at least one data item relating to the geographical position of the user device, and
- at least one data item relating to the time of the request for access to the user device,
- etc.

Advantageously, the URL address of the first internet page can be stored beforehand and the internet browser can be configured to open only said internet authentication page during the display step.

In particular, the internet browser window can be configured so as not to display an address bar, so that the user cannot enter or modify the displayed URL address.

Of course, the method according to one or more embodiments of the invention can be used when the user device is not located in an authentication domain. In this case, the step of opening a session opens a local session permitting access to the user device outside any authentication domain.

The method according to one or more embodiments of the invention can also be used when the user device is located in an authentication domain. In this case, the step of opening a session can be used to open:
- a local session, i.e. a local session permitting access to the user device outside said authentication domain; or
- a network session in said authentication domain in which said user device is located.

In this case, the user can be asked to choose the type of session before the authentication phase, during the step of opening a session.

According to another aspect of the present invention, a computer program is proposed comprising instructions which, when they are executed by at least one data processing device, implement all the steps of the authentication method according to one or more embodiments of the invention.

The computer program can be coded in any suitable programming language, for example in C, C++, Java, Python, etc.

The computer program can comprise a part, called client part, installed on the user device and a part, called server part, installed on at least one authentication server.

According to another aspect of the present invention, a system is proposed for authenticating a user on a user device comprising:
- at least one authentication server, and
- at least one user device, remote from said authentication server, and connected to said authentication server by an internet connection; configured to implement all the steps of the method following the authentication according to the invention.

In particular, the user device can comprise a client authentication agent, in particular in the form of an application, configured to implement all the steps of the method according to one or more embodiments of the invention taking place at the level of the user device.

This client authentication agent can be configured to launch an internet browser window in which the first internet page of the authentication server is displayed.

This client authentication agent can be configured so that prior to displaying the first internet page, it establishes an internet connection at the level of the internet device. Alternatively, the internet connection of the user device can be managed by another application or process, independently of the authentication agent. In this case, the client authentication agent can be configured to trigger the execution of this other application, or this other process, in order to request the establishment of an internet connection.

The client authentication agent can be configured to receive the proof of authentication and to open a session on the user device, directly or by means of another application to which said proof of authentication is supplied.

When the authentication data item is valid for a predetermined time period, the client authentication agent can be configured to keep the session open during this time period and close the session when said time period has elapsed, optionally after prior warning to the user.

The client authentication agent can be configured to offer several authentication modes and to take account of the authentication mode chosen by the user.

In particular, the authentication server can comprise a server authentication agent, in particular in the form of an application, configured to implement all the steps of the method according to one or more embodiments of the invention taking place at the level of said authentication server.

This server authentication agent can be configured to implement an authentication process, alone or in co-operation with at least one other server.

This server authentication agent can be configured to receive:
- at least one identification data item, and
- optionally, at least one contextual data item;

and implement at least one verification, as a function of said data items, in order to determine if the user does or does not have the right of access to the user device, in order to generate and supply a proof of authentication, alone or in co-operation with another device or server.

The user device can be any type of data processing device capable of connecting to the internet network, such as a computer, a tablet, a smart phone, etc.

BRIEF DESCRIPTION OF THE DRAWINGS

Other advantages and characteristics will become apparent on examination of the detailed description of an embodiment that is in no way limitative, and from the attached drawings in which.

DETAILED DESCRIPTION OF THE INVENTION

It is well understood that the embodiments that will be described hereinafter are in no way limitative. In particular, variants of the invention can be envisaged comprising only a selection of characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In the figures, the elements common to several figures retain the same reference.

Figure 1:
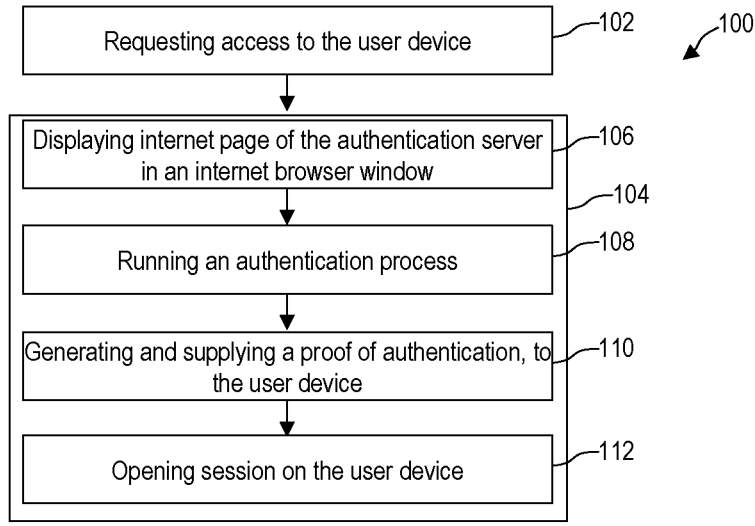
FIGS. 1 to 4 are diagrammatic representations of non-limitative embodiment examples of an authentication method according to one or more embodiments of the invention.

FIG. 1 is a diagrammatic representation of a non-limitative embodiment example of an authentication method according to one or more embodiments of the invention.

The method 100, represented in FIG. 1, can be implemented to authenticate a user in order to permit said user to access a user device.

The method 100 can be implemented to open an access session to the user device, whether or not the latter is located in an authentication domain.

The method 100 is performed when a user transmits a request for access to the user device, during a step 102. Such an access request can be powering up the user device, or its wake from standby. Alternatively, the access request can be expressed by launching an authentication application, either by pressing one or more keys of a keyboard of the user device, or by selecting a function in a user interface displayed on a screen of the user device, utilizing a pointer, for example.

An authentication phase 104 is executed in response to the access request.

The authentication phase 104 comprises a step 106 of displaying, in an internet browser window, a first internet page of an authentication server, the URL address of which is stored beforehand in the user device.

The internet browser is configured beforehand to open this first internet page in step 106 and the browser window does not permit the user to enter or modify the URL address displayed.

During a step 108, an authentication process is run from the first internet page of the authentication server. The authentication process can be of any type. Non-limitative examples of authentication processes are given below. The authentication process can be run exclusively on the authentication server or can call at least one other server. The authentication process can be performed entirely in the first internet page displayed during step 106, or can generate the display of at least one other page, of the same server or another server, in particular in a chained manner.

When the user is unsuccessful in the authentication process triggered during step 108, then the authentication phase 104 is terminated.

When the user is successful in the authentication process triggered during step 108, then a proof of authentication is generated and supplied to the user device, during a step 110. This proof of authentication can be of any type. Non-limitative examples of proofs of authentication are given below.

During a step 112, the proof of authentication is used in the user device, for opening a user session permitting said user access to and use of the user device.

It should be noted that steps 102-112 are performed before any access by the user to the user device, and are specifically performed to permit the user to access the user device.

Figure 2:
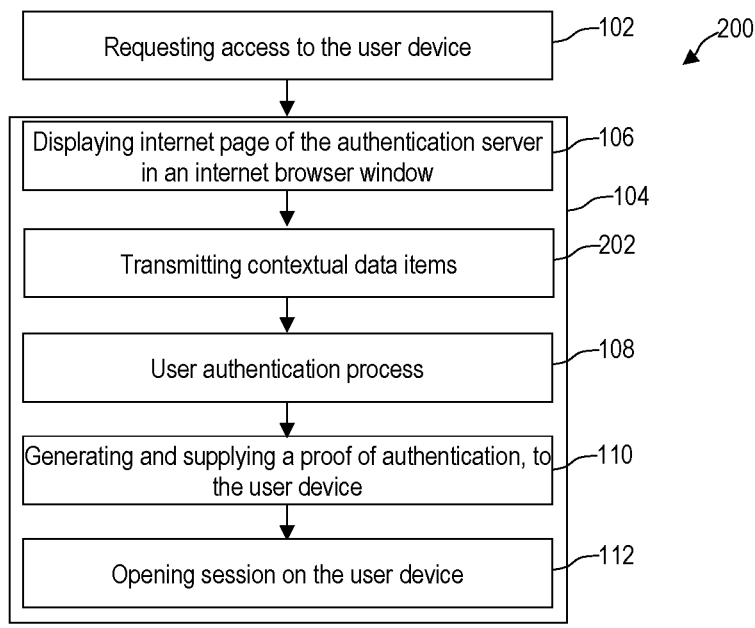

FIG. 2 is a diagrammatic representation of another non-limitative embodiment example of an authentication method according to one or more embodiments of the invention.

The method 200, in FIG. 2, comprises all the steps of the method 100 in FIG. 1.

The method 200 also comprises, during the authentication phase 104, a step 202 of transmitting, by the user device to the authentication server, or to another server taking part in the authentication process, at least one contextual data item, which will be used during the authentication process, in order to permit or deny access for this user to the user device. In other words, the authentication, i.e. permitting or denying access to the user device, for this user will be a function of at least one contextual data item.

The contextual data item or items can comprise any combination of at least one of the following data items:
- at least one data item relating to the user device, such as a serial number, a characteristic of an operating system of said user device;
- at least one data item relating to at least one application currently running, or active, at the level of the device, such as for example an antivirus application active in the user device;
- at least one data item relating to the geographical position of the user device;
- at least one data item relating to the time of the request for access to the user device;
- etc.

For example, the authentication process can be configured to permit or deny access to the user device, when the time of access is too late, or when the sites of access are located in an unusual area, etc. To this end, the authentication process can consult a register of predefined rights for this user stored on the authentication server or on another server accessible by said authentication server via a communication network such as the internet.

Generally, the authentication process can consult at least one access right applicable for this user and for this user device. This at least one access right can be stored at the level of the authentication server, or of another device or server that can be accessed via the internet network.

Figure 3:
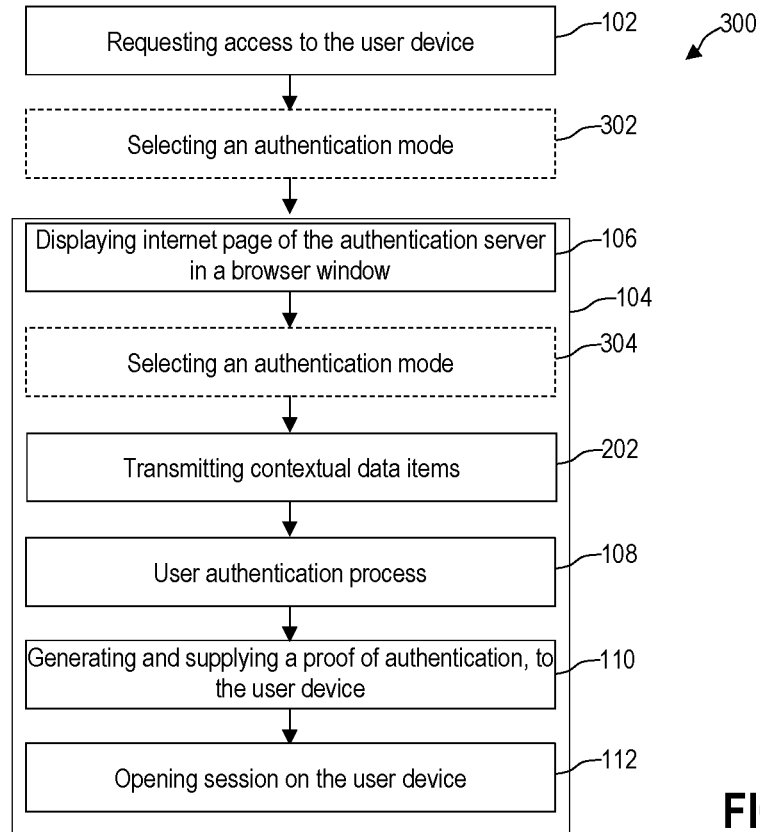

FIG. 3 is a diagrammatic representation of another non-limitative embodiment example of an authentication method according to one or more embodiments of the invention.

The method 300, in FIG. 3, comprises all the steps of the method 200 in FIG. 2.

Moreover, the method 300 can comprise in addition, before the authentication phase 104, a step 302 of selecting, at the level of the user device, an authentication mode from among several authentication modes. Generally, the user device can offer, via a user interface, several authentication modes, such as for example weak authentication by username and password, or strong authentication by supplying a one-time data item, for example. The user can choose the desired authentication mode and validate this choice, for example by selecting from a drop-down list or by selecting a button associated with the desired authentication mode.

The authentication mode chosen by the user can affect whether or not the authentication phase 104 is run.

The authentication mode chosen by the user can affect the content of the authentication phase, such as for example on the authentication server, and/or the authentication process, one or more of which will be used during the authentication phase.

The authentication mode chosen by the user can also affect the nature of the proof of authentication. Thus, as a function of the authentication mode chosen, the proof of authentication can be single-use or multiple-use, have time-limited validity or not, or else capable of being used for federated authentication or not, etc.

Alternatively or in addition, the method 300 can comprise, during the authentication phase 104 and after the step 106 of displaying the internet page, a step 304 of selecting, at the level of the authentication server, an authentication mode from among several more authentication modes.

Generally, the first internet page displayed during step 106 can offer several authentication modes. The user can choose the desired authentication mode and validate this choice, for example by selecting from a drop-down list or by selecting a button associated with the desired authentication mode.

The authentication mode chosen by the user can affect the authentication process that will be implemented during step 108, such as for example on the identity of the authentication server, on the nature of the identification data items to be supplied, on the nature of the proof of authentication, etc.

Of course, step 302, and/or step 304, of selecting an authentication mode can be implemented in the method 100 in FIG. 1, without step 202 of transmission of contextual data.

Figure 4:
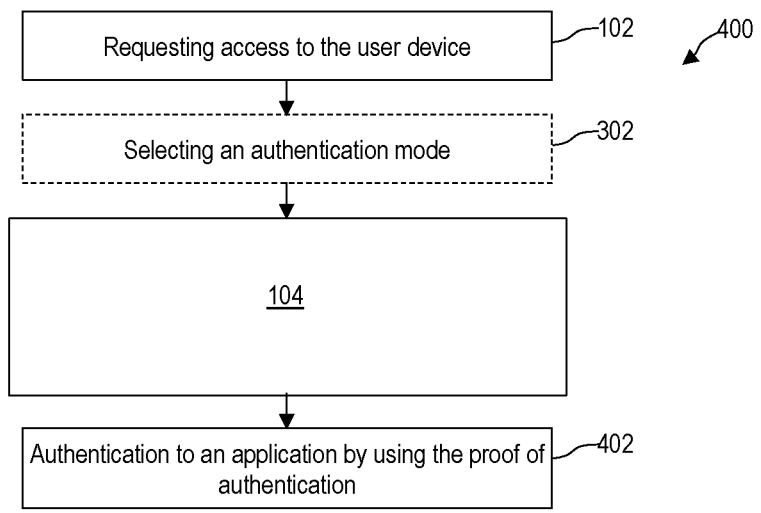

FIG. 4 is a diagrammatic representation of another non-limitative embodiment example of an authentication method according to one or more embodiments of the invention.

The method 400, in FIG. 4, comprises all the steps of the method 300 in FIG. 3.

In addition, the method 400 comprises, following the authentication phase 104 having led to the opening of an access session on the user device, a step of authenticating the user for access to:
- at least one locally installed application, or
- at least one application installed on a remote server accessible via a communication network such as the internet network, and in particular to a SaaS application;
- with the proof of authentication obtained during the authentication phase.

Thus, the proof of authentication obtained during the authentication phase makes it possible to perform federated authentication of the user:
- for accessing the user device, and
- for accessing at least one application via the user device.

Of course, step 402 of authenticating to an application can be implemented in the method 100 in FIG. 1, or in the method 200 in FIG. 2, which do not implement step 302 and step 304 of selecting an authentication mode.

In all the examples described above with reference to FIGS. 1-4, the proof of authentication can be any type of numerical proof, and can comprise any type of data, such as for example:
- an encrypted data item, in particular with a private key associated with a public key stored at the level of the user device: in this case, the user device is configured to decrypt the data item received with the public key and use this data item to give user access to the user device;
- an authentication token, in particular single-use.
- an authentication token having a one-time validity such that when it has been used once it loses its validity;
- an authentication token having permanent validity;
- an authentication token having validity limited to a predetermined time period. In this case, provision can be made to terminate the access of this user to the user device on termination of the validity of the token;
- a multiple-use authentication token, valid for permitting access of the same user to the same user device on several occasions;
- etc.

In all the examples described above with reference to FIGS. 1-4, the authentication process can be of any type, and can perform single-factor authentication (weak authentication) or multi-factor authentication (strong authentication).

The authentication process can verify the identity of the user as a function of at least one identity data item supplied, such as for example a username, a password, a one-time password, a biometric data item such as a fingerprint, a facial data item, a retinal data item, etc.

According to an advantageous option, the authentication process can verify at least one access right applicable to the user, stored on the authentication server or on another device or server that can be accessed by the authentication server via the internet network for example.

Figure 5:
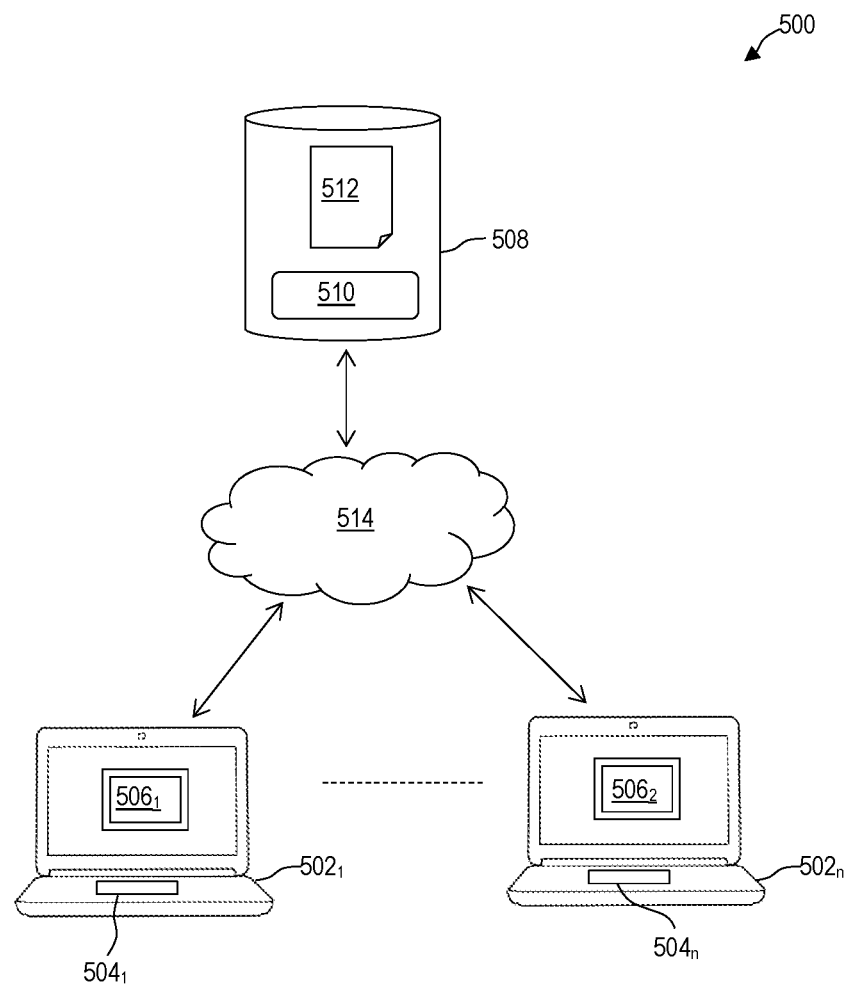
FIG. 5 is a diagrammatic representation of a non-limitative embodiment example of an authentication system according to one or more embodiments of the invention.

FIG. 5 is a diagrammatic representation of a non-limitative embodiment example of an authentication system according to one or more embodiments of the invention.

The system 500 in FIG. 5 can implement an authentication method according to one or more embodiments of the invention, and in particular any one of the methods 100, 200, 300 or 400 in FIG. 1-5.

The system 500 comprises at least one user device 502. In the example shown, the system comprises a plurality of user devices $502_1$-$502_n$. Each user device $502_i$ can be any type of data processing device capable of connecting to the internet network, such as a computer, a tablet, a smart phone, etc.

Each user device $502_1$-$502_n$ comprises an authentication agent $504_1$-$504_n$, called a client authentication agent, configured to implement the steps of the method according to one or more embodiments of the invention that are run at the level of the user device. In particular, the client authentication agent $504_i$ is configured to launch an internet browser window, respectively $506_1$-$506_n$, at the level of the user device, respectively $502_1$-$502_n$, in order to perform authentication of a user on said user device $502_1$-$502_n$, to permit or deny access of said user to said user device $502_1$-$502_n$.

Generally, the client authentication agent $504_i$ can be configured to also perform at least one of the operations/ steps described above in relation to the client authentication agent $504_i$, or the user device $502_i$.

The system 500 also comprises one or more authentication servers.

In the example shown, the system 500 comprises a single authentication server 508. The authentication server 508 comprises an authentication agent 510, called server authentication agent, configured to implement the steps of the method according to one or more embodiments of the invention that are run at the level of the authentication server 508.

Generally, the server authentication agent 510 can be configured to also perform at least one of the operations/steps described above in relation to the server authentication agent, or the authentication server.

The authentication server 508 can also comprise one or more databases 512 storing identification data items, and optionally access rights.

Each user device $502_1$-$502_n$ can communicate with the authentication server 508 via the internet network 514.

A non-limitative embodiment example will now be described of authentication of a user in order to permit or deny their access to a user device, i.e. in order to permit or deny their opening a session on a user device, in the particular case of a user desiring to access a workstation of an enterprise.

A user (U), from a user device, also called workstation (Ws) attempts to open a session on said workstation (Ws). The workstation (Ws) can be connected to the enterprise network. The workstation (Ws) may not be on the enterprise network but connected to the internet from any access point.

The user (U) selects a client authentication agent, also called authentication tile of the enterprise (ATe). This tile can be the default tile and optionally the only authentication tile available and configured on the workstation (Ws).

Selecting the tile launches a minimalist web browser window, a simple window with no menu, navigation bar, bookmarks or decoration (commonly called WebView).

When the WebView is opened, the authentication tile ATe can transmit to the WebView technical information on the workstation, such as for example the presence and activation of the antivirus, the serial number or identification of the workstation Ws, the version level of the operating system, the geographical position if GPS data are known, the update level of the security patches or any other technical information capable of affecting the authentication context and the security of use of the workstation Ws.

The WebView automatically opens the only URL configured, that of an authentication server, also called identity provider (IdP) of the enterprise. The user U does not have any means to open another URL than that initially configured by the administrator Adm of the security of the enterprise workstations Ws.

The first web page of the IdP displays in the WebView. This page can be configured to request:
 either only the identity of the user (U): their username, email address, or any other information making it possible to identify the user uniquely, before offering one or more authentication methods associated with the user;
 or a username and password or a secret associated with the user (U);
 or to offer a list of authentication methods. Some of these methods may require one-time passwords (OTP) to be entered, or the use of security keys (FIDO), others may chain several methods (chained multi-factor), or redirect to another IdP or authentication server also offering its own authentication methods.

The IdP authentication server chains as many pages as necessary as a function of its authentication criteria resulting from analysis of the authentication context of the user (geolocation, IP address, time interval, technical context of their workstation (Ws), behaviour of the user, etc.) The IdP authentication server can thus perform a weak authentication, a strong (multi-factor) authentication, or deny authentication, as a function of the contextual and dynamic analysis.

If the user fails to authenticate, the WebView does not transmit any proof of authentication to the authentication tile ATe, or transmits a data item attesting a denied authentication. Access to the workstation Ws is denied.

If the user is successfully authenticated to the IdP, then a proof of authentication PA is transmitted by the IdP, via the WebView, to the authentication tile ATe.

The authentication tile ATe verifies the proof of authentication PA. This proof can be in various forms, namely:
 an encrypted data item with a private key of the IdP, which is decrypted with a public key known by the ATe tile: this key can be configured in the parameters of the tile. The data items can then contain multiple information items on the user: their username, their surname/forename, their email address, etc.
 a token, for example an OAuth bearer token, this token must then be verified to the IdP in order to obtain the user information items. This token can be used regularly to verify that the user still has access rights and therefore to perform continuous authorization of the user on the workstation Ws throughout their session. The token can also be used for access to other applications (SaaS) via federated identity supplied by the IdP, and thus it will be possible to perform Single Sign-On (SSO-single authentication) functions on several, or even all, the applications used by the enterprise, in SaaS mode or in the enterprise information system.

Once the proof PA has been successfully verified, for example according to one of the methods described above by way of non-limitative examples, the session is opened for the user U on the workstation Ws.

The user has access to the data items of the workstation. The user can access SaaS applications of the enterprise or internal applications. For accessing web or SaaS applications, these can call the same enterprise IdP in order to identify and authenticate the user, by using the same web protocols and mechanisms as for the authentication performed for access to the workstation.

Throughout the open session for the user U on the workstation Ws, a background task process can periodically perform verification of the token obtained and monitor that the user U is still permitted to access the workstation Ws.

Of course, these examples are given by way of particular examples only, and the invention is not limited to the examples detailed above. Numerous variants of the examples given above can be envisaged, without departing from the scope of the invention as defined in the main claims.

What is claimed is:

1. A method for authenticating a user on a user device, said method comprising:
 receiving an access request by said user to access the user device;
 authenticating the user in order to permit or deny said user said access to said user device to open an access session on said user device, wherein said authenticating is executed in response to said access request that is received,
wherein said authenticating comprises,
in response to said access request by the user to open said access session on said user device, before said user is permitted accesses to said access session on said user device, said access request comprising
a power up of the user device or
a wake from standby mode of said user device,
displaying, in a window of an internet browser, a first internet page of an authentication server that is remote from said user device to which said user device is connected to beforehand via an internet network;
initiating, via said first internet page, a process of authenticating said user to at least one server remote from said user device;
when said process of authenticating said user is successful, supplying, by said at least one remote server to said user device, at least one data item, called proof of authentication, attesting to successful authentication;
wherein the authenticating said user is performed by a sequence of internet pages comprising the first internet page and at least one other internet page displayed, in particular in a chained manner, by said authentication server or by another authentication server,
wherein
prior to said authenticating, selecting an authentication mode among several authentication modes, or
during said authenticating, selecting said authentication mode among said several authentication modes, in the window of the internet browser, and
wherein said authenticating is carried out according to the authentication mode that is selected; and,
opening said access session to said user device, on said user device, by using said proof of authentication.

2. The method according to claim 1, wherein the process of authenticating said user verifies an identity of the user as a function of at least one identity data item supplied by the user device to the authentication server, the proof of authentication being supplied as a function of said identity.

3. The method according to claim 1, wherein the process of authenticating said user verifies at least one access right applicable to the user, the proof of authentication being supplied as a function of said at least one access right.

4. The method according to claim 3, wherein the proof of authentication comprises
an encrypted data item, in particular with a private key associated with a public key stored at a level of said user device; and/or
an authentication token, in particular single-use or multiple-use.

5. The method according to claim 1, further comprising using the proof of authentication, after said access to said user device, to perform a federated authentication of the user to one or more of
an external application, run on a server remote from the user device and accessible by said user device via the internet network;
an internal application, run on a server located in a network, or authentication domain, in which said user device is located, and accessible by said user device via said network.

6. The method according to claim 1, wherein the process of authenticating said user is performed
exclusively by the authentication server;
by the authentication server and at least one other server; and,
by a server other than the authentication server.

7. The method according to claim 1, wherein the authenticating further comprises transmitting, by the user device to the authentication server, at least one contextual data item relating to authentication, wherein the authenticating takes into account said at least one contextual data item.

8. The method according to claim 1, wherein a URL address of the first internet page is stored beforehand and the internet browser is configured to open only said first internet page during displaying.

9. The method according to claim 1, wherein opening the access session opens
a local session on the user device, or
a network session in a domain, or a network, in which the user device is located.

10. A non-transitory computer program comprising instructions which, when said instructions are executed by at least one data processing device, implement a method for authenticating a user on a user device, said method comprising:
receiving an access request by said user to access the user device;
authenticating the user in order to permit or deny said user said access to said user device to open an access session on said user device,
wherein said authenticating is executed in response to said access request that is received,
wherein said authenticating comprises,
in response to said access request by the user to open said access session on said user device, before said user is permitted accesses to said access session on said user device, said access request comprising
a power up of the user device or
a wake from standby mode of said user device,
displaying, in a window of an internet browser, a first internet page of an authentication server that is remote from said user device to which said user device is connected to beforehand via an internet network;
initiating, via said first internet page, a process of authenticating said user to at least one server remote from said user device;
when said process of authenticating said user is successful, supplying, by said at least one server to said user device, at least one data item, called proof of authentication, attesting to successful authentication;
wherein the authenticating said user is performed by a sequence of internet pages comprising the first internet page and at least one other internet page displayed, in particular in a chained manner, by said authentication server or by another authentication server,
wherein
prior to said authenticating, selecting an authentication mode among several authentication modes, or
during said authenticating, selecting said authentication mode among said several authentication modes, in the window of the internet browser, and wherein said authenticating is carried out according to the authentication mode that is selected; and, opening said access session to said user device, on said user device, by using said proof of authentication.

11. A system that authenticates a user on a user device comprising:

at least one authentication server that is remote from said user device, at least one user device, remote from said at least one authentication server, and connected to said at least one authentication server by an internet connection;

wherein said at least one authentication server is configured to receive an access request by said user to access the user device;

authenticate the user in order to permit or deny said user access to said user device to open an access session on said user device, wherein said authenticating is executed in response to said access request that is received, wherein said authenticate comprises, in response to said access request by the user to open said access session on said user device, before said user is permitted accesses to said access session on said user device, said access request comprising a power up of the user device or a wake from standby mode of said user device, display, in a window of an internet browser, a first internet page of an authentication server that is remote from said user device to which said at least one user device is connected to beforehand via an internet network;

initiate, via said first internet page, a process of authenticating said user to at least one server remote from said at least one user device;

when said process of authenticating said user is successful, supply, by at least one remote server to said at least one user device, at least one data item, called proof of authentication, attesting to successful authentication;

wherein the authenticate said user is performed by a sequence of internet pages comprising the first internet page and at least one other internet page displayed, in particular in a chained manner, by said authentication server or by another authentication server, wherein prior to said authenticate, select an authentication mode among several authentication modes, or during said authenticate, select said authentication mode among said several authentication modes, in the window of the internet browser, and wherein said authenticate is carried out according to the authentication mode that is selected; and, open said access session to said at least one user device, on said user device, by using said proof of authentication.

* * * * *